(No Model.)
H. N. H. LUGRIN.
FLEXIBLE SHUTTER.
No. 461,884. Patented Oct. 27, 1891.
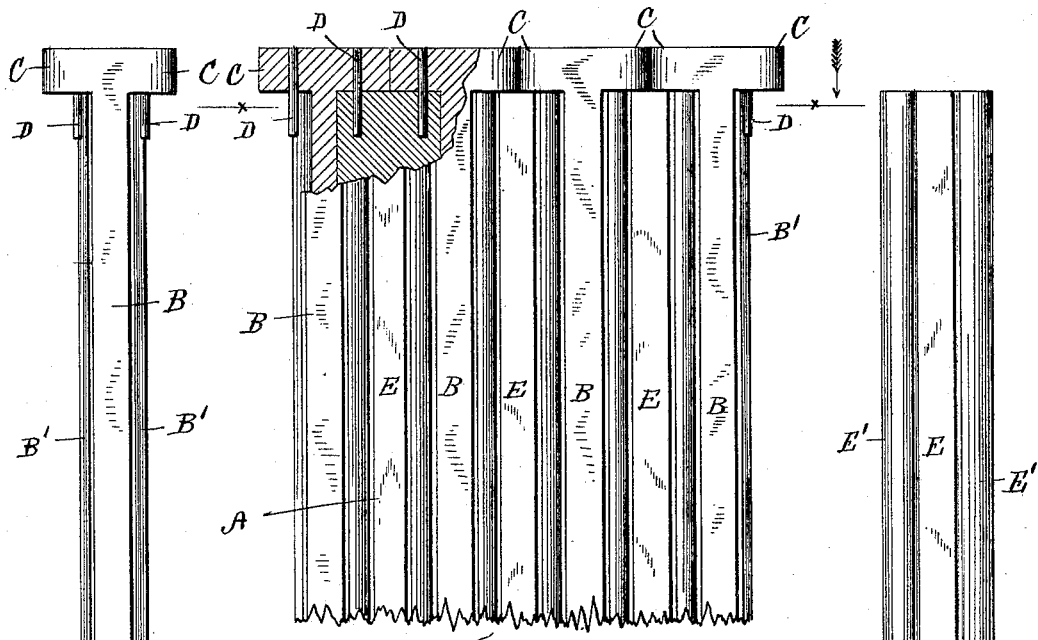
Fig. 1.
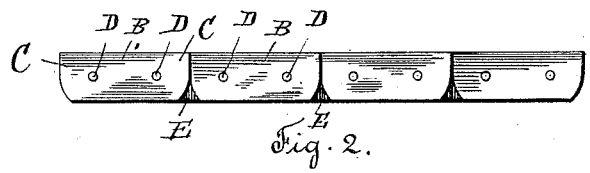
Fig. 2.
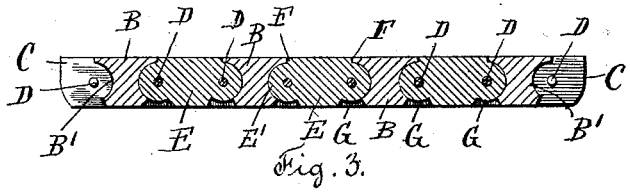
Fig. 3.
Fig. 4.
Fig. 5.
Witnesses
Frederick E. Pollard
Clara A. Blake
Inventor
Horatio N. H. Lugrin
By his Attorney
Rufus B. Fowler

UNITED STATES PATENT OFFICE.

HORATIO N. H. LUGRIN, OF WORCESTER, MASSACHUSETTS, ASSIGNOR, BY DIRECT AND MESNE ASSIGNMENTS, TO THE LUGRIN FLEXIBLE DOOR COMPANY, OF PORTLAND, MAINE.

FLEXIBLE SHUTTER.

SPECIFICATION forming part of Letters Patent No. 461,884, dated October 27, 1891.

Application filed January 5, 1891. Serial No. 376,801. (No model.)

*To all whom it may concern:*

Be it known that I, HORATIO N. H. LUGRIN, a citizen of the United States, residing at Worcester, in the county of Worcester and State of Massachusetts, have invented a new and useful Improvement in Flexible Shutters, of which the following is a specification, reference being had to the accompanying drawings, forming a part of the same and illustrating a portion of a shutter embodying my invention.

Figure 1 represents a portion of a shutter embodying my invention, part of which is shown in sectional view in order to disclose the pintles by which the parallel bars or leaves are hinged together. Fig. 2 represents an end view of the same. Fig. 3 is a sectional view on line X X, Fig. 1. Fig. 4 represents one of the bars or leaves to which the shorter bars or leaves are hinged; and Fig. 5 represents one of the shorter bars or leaves which are hinged to the bars or leaves, of which one is represented in Fig. 4.

Similar letters refer to similar parts in the several figures.

My present invention relates to a flexible shutter or curtain consisting of a series of parallel bars or leaves hinged together at their ends in the manner hereinafter described.

Referring to the drawings, A A represent a portion of the flexible curtain or shutter, composed of a series of bars B, having the lateral lugs or extensions C upon each end, in which are inserted the pintles D. Between each of the bars B are placed the shorter bars or leaves E, the length of the bars or leaves E being equal to the distance between the lugs C C upon opposite ends of the bars or leaves B. The pintles D extend through the lugs C and into the ends of the bars E, thereby hinging the shorter bars or leaves E to the lugs C of the adjacent bars B upon each side. The sides of the bars or leaves B are made concave, as represented at B' in Fig. 4, and the edges of the shorter bars E are made convex, as shown at E', Fig. 5, to fit the concave sides B' of the bars B. The concave sides B' and the convex sides E' are made concentric with the pintles D. Shoulders F, Fig. 3, are preferably provided upon one side of the bars B and E in order to limit the hinging motion in one direction and enable the shutter to be extended and form a plane surface, while upon the opposite side of the bars portions are cut away, as at G, Fig. 3, in order to allow the hinged bars to turn upon each other and allow the shutter to be wound up. The concave sides B' of the bars B also form a socket into which the concave edges E' of the bars E extend, as shown in sectional view in Fig. 3, thereby preventing the lateral displacement of the bars as they are held together by the pintles D. This mode of constructing a flexible shutter permits the entire shutter to be constructed of wood without the use of canvas or other flexible material in order to unite the wooden bars or leaves.

What I claim as my invention, and desire to secure by Letters Patent, is—

1. In a flexible shutter, the combination of a series of parallel bars or leaves, the alternate bars in said series being provided with lateral lugs at each end, said lugs extending over the ends of the adjacent bars, and pintles extending through said lugs into the ends of said adjacent bars, by which said lugs and bars are hinged together, substantially as described.

2. In a flexible shutter, the combination of a series of parallel bars or leaves, the alternate bars in said series being provided with lateral lugs at their ends, said lugs overlapping the ends of the adjacent bars, and pintles extending through said lugs into the ends of said adjacent bars, whereby they are hinged together, and said series of parallel bars being provided with interlocking edges by which said bars are held from lateral displacement, substantially as described.

3. In a flexible shutter, the combination of a series of bars or leaves forming the body of the shutter, lugs extending laterally from the ends of one-half of said bars and overlapping the ends of alternate bars, and pintles extending through said lugs into the ends of said alternate bars, by which said bars or leaves are hinged together, and one-half of said bars being provided alternately with concave edges and the alternate bars being provided with convex edges, said concave and convex edges being concentric with the axes of said pintles, substantially as described.

Dated at Worcester, in the county of Worcester and State of Massachusetts, this 1st day of January, 1891.

HORATIO N. H. LUGRIN.

Witnesses:
 RUFUS B. FOWLER,
 FREDERICK E. POLLARD.